US012403620B2

(12) United States Patent
Bucks

(10) Patent No.: US 12,403,620 B2
(45) Date of Patent: *Sep. 2, 2025

(54) CUTTING HEAD FOR A CENTRIFUGAL CUTTING APPARATUS AND CENTRIFUGAL CUTTING APPARATUS EQUIPPED WITH SAME

(71) Applicant: FAM, Kontich (BE)

(72) Inventor: Brent L. Bucks, Lakewood Ranch, FL (US)

(73) Assignee: FAM, Kontich (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,186

(22) Filed: May 9, 2023

(65) Prior Publication Data

US 2023/0278248 A1 Sep. 7, 2023

Related U.S. Application Data

(62) Division of application No. 17/591,018, filed on Feb. 2, 2022, now Pat. No. 11,673,286, and a division of (Continued)

(30) Foreign Application Priority Data

Oct. 2, 2017 (EP) .................................... 17194379

(51) Int. Cl.

*B26D 7/26* (2006.01)
*B26D 1/03* (2006.01)
*B26D 7/06* (2006.01)

(52) U.S. Cl.

CPC ............. *B26D 7/2614* (2013.01); *B26D 1/03* (2013.01); *B26D 7/0691* (2013.01); *B26D 7/2628* (2013.01); *B26D 2210/02* (2013.01)

(58) Field of Classification Search

CPC ...... B26D 7/2614; B26D 1/03; B26D 7/0691; B26D 7/2628; B26D 2210/02

See application file for complete search history.

(56) References Cited

U.S. PATENT DOCUMENTS 1,474,797 A 11/1923 Spicer
2,195,879 A 4/1940 Urschel et al.

(Continued)

FOREIGN PATENT DOCUMENTS

BE 1020687 A3 3/2014
BE 1020824 A5 5/2014

(Continued)

OTHER PUBLICATIONS

Exhibit A.

(Continued)

*Primary Examiner* — Omar Flores Sanchez
(74) *Attorney, Agent, or Firm* — Ipsilon USA—NLO

(57) ABSTRACT

A cutting head for a centrifugal cutting apparatus includes a rim structure; and a plurality of cutting stations mounted onto the rim structure, each of said cutting stations comprising a cutting element for cutting food products at a leading end of the cutting station and an inner wall extending from the leading end to a trailing end and forming a product sliding surface, along which the food product slides between successive cuts. The cutting stations are assembled adjacent one another onto the rim structure in such a way that a gap is present between each pair of adjacent cutting stations through which a product slice exits the cutting head upon being cut. The cutting head also includes a gap setting mechanism for setting the radial size of the gap by adjusting the radial offset of the trailing end of the respective cutting station with respect to the rim structure.

16 Claims, 6 Drawing Sheets

Related U.S. Application Data application No. 17/175,725, filed on Feb. 15, 2021, now Pat. No. 11,305,449, and a division of application No. 16/147,956, filed on Oct. 1, 2018, now Pat. No. 10,919,173.

(56) References Cited

U.S. PATENT DOCUMENTS

| | | | |
|---|---|---|---|
| 2,436,410 | A | 2/1948 | Urschel et al. |
| 2,832,387 | A | 4/1958 | Woodward, Jr. |
| 2,875,800 | A | 3/1959 | Urschel |
| 2,934,117 | A | 4/1960 | Urschel |
| 3,033,204 | A | 5/1962 | Wood |
| 3,196,916 | A | 7/1965 | Urschel |
| 3,255,646 | A | 6/1966 | Urschel |
| 3,395,742 | A | 8/1968 | Sanders |
| 3,472,297 | A | 10/1969 | Urschel |
| 3,823,880 | A | 7/1974 | Urschel |
| 3,888,426 | A | 6/1975 | Urschel et al. |
| 3,989,196 | A | 11/1976 | Urschel |
| 4,042,183 | A | 8/1977 | Cumpston |
| 4,523,503 | A | 6/1985 | Julian et al. |
| 4,604,925 | A | 8/1986 | Wisdom |
| 4,610,397 | A | 9/1986 | Fischer et al. |
| 4,660,778 | A | 4/1987 | Fischer et al. |
| 4,813,317 | A | 3/1989 | Urschel |
| 4,937,084 | A | 6/1990 | Julian |
| 5,274,899 | A | 1/1994 | Sentagnes et al. |
| 5,555,787 | A | 9/1996 | Barber et al. |
| 5,694,824 | A | 12/1997 | Jacko et al. |
| 5,819,628 | A | 10/1998 | Cogan et al. |
| 5,964,138 | A | 10/1999 | Metzner et al. |
| 6,116,130 | A | 9/2000 | Cogan |
| 6,155,151 | A | 12/2000 | Reichert |
| 6,314,849 | B1 | 11/2001 | Arrasmith |
| 6,536,691 | B2 | 3/2003 | Prewitt et al. |
| 6,883,411 | B2 | 4/2005 | Arrasmith et al. |
| 6,920,813 | B2 | 7/2005 | Bucks |
| 7,270,040 | B2 | 9/2007 | King et al. |
| 7,525,672 | B1 | 4/2009 | Chen et al. |
| 8,033,204 | B2 | 10/2011 | Bucks |
| 9,352,478 | B2 | 5/2016 | Koide |
| 9,517,572 | B2 | 12/2016 | Michel et al. |
| 9,862,113 | B2 | 1/2018 | Jacko |
| 9,902,080 | B2 | 2/2018 | Michel et al. |
| 10,279,495 | B2 | 5/2019 | Jacko |
| 10,632,640 | B2 | 4/2020 | Bucks |
| 10,780,602 | B2 | 9/2020 | Gereg et al. |
| 10,786,922 | B2 | 9/2020 | Gereg |
| 11,186,005 | B2 | 11/2021 | Bucks |
| 2004/0216572 | A1 | 11/2004 | King et al. |
| 2004/0237747 | A1* | 12/2004 | King .................... B26D 7/2614 83/932 |
| 2006/0172816 | A1 | 8/2006 | Johnson |
| 2007/0189766 | A1 | 8/2007 | Kuwahara et al. |
| 2008/0022822 | A1 | 1/2008 | Jacko et al. |
| 2008/0022828 | A1 | 1/2008 | Bucks |
| 2009/0202694 | A1 | 8/2009 | Julian et al. |
| 2010/0015312 | A1 | 1/2010 | Bellmunt-Molins |
| 2010/0130981 | A1 | 5/2010 | Richards |
| 2010/0206185 | A1 | 8/2010 | Bucks |
| 2013/0276604 | A1 | 10/2013 | King et al. |
| 2014/0007751 | A1 | 1/2014 | Michel et al. |
| 2014/0060278 | A1 | 3/2014 | Koide |
| 2014/0230620 | A1 | 8/2014 | Bucks |
| 2014/0230621 | A1 | 8/2014 | Bucks |
| 2014/0257413 | A1 | 9/2014 | Appenzeller et al. |
| 2014/0290451 | A1 | 10/2014 | Jacko |
| 2016/0075047 | A1* | 3/2016 | Bucks .................. B26D 7/2614 83/403 |
| 2016/0361831 | A1 | 12/2016 | Fant |
| 2017/0050329 | A1 | 2/2017 | Michel |
| 2017/0106550 | A1 | 4/2017 | Jacko |
| 2018/0229390 | A1 | 8/2018 | Gereg |
| 2019/0143554 | A1 | 5/2019 | Gereg |
| 2019/0210239 | A1 | 7/2019 | Baxter |
| 2019/0232514 | A1 | 8/2019 | Bucks |
| 2019/0329437 | A1 | 10/2019 | Gereg |
| 2019/0375126 | A1 | 12/2019 | Baxter |

FOREIGN PATENT DOCUMENTS

| | | | |
|---|---|---|---|
| BE | 1022372 | B1 | 3/2016 |
| BE | 1022746 | A1 | 8/2016 |
| EP | 0301996 | A2 | 2/1989 |
| EP | 0289220 | A3 | 1/1990 |
| EP | 0301996 | A3 | 3/1991 |
| EP | 0756534 | B1 | 7/2003 |
| EP | 2124772 | A1 | 12/2009 |
| EP | 2249668 | A2 | 11/2010 |
| EP | 2012982 | B1 | 5/2011 |
| EP | 2326471 | B1 | 5/2012 |
| EP | 1617977 | B1 | 5/2013 |
| EP | 1626844 | B1 | 5/2013 |
| EP | 1638741 | B1 | 2/2015 |
| EP | 2964122 | A2 | 1/2016 |
| EP | 2981181 | B1 | 12/2016 |
| EP | 3461605 | A1 | 4/2019 |
| EP | 3414063 | B1 | 1/2021 |
| EP | 3802028 | A1 | 4/2021 |
| EP | 3243613 | B1 | 10/2021 |
| EP | 3981563 | A1 | 4/2022 |
| EP | 3706969 | B1 | 7/2022 |
| EP | 3307499 | B1 | 10/2022 |
| EP | 3580027 | B1 | 7/2024 |
| EP | 2800652 | B2 | 12/2024 |
| WO | 02068122 | A1 | 9/2002 |
| WO | 2004106015 | A2 | 12/2004 |
| WO | 2013101621 | A1 | 7/2013 |
| WO | 2014165572 | A1 | 10/2014 |
| WO | 2015075179 | A1 | 5/2015 |
| WO | 2015075180 | A1 | 5/2015 |
| WO | 2016201400 | A1 | 12/2016 |

OTHER PUBLICATIONS

Exhibit B—Diversacut Sprint™ Dicer, Instruction Manual, Urschel Laboratories.

Exhibit C—Model GRL, Instruction Manual, Urschel Laboratories.

Exhibit D—Quanticut® Dicer, Model Q, Instruction Manual, Urschel Laboratories.

E—Sprint 2™ Dicer, Model MSPR2, Parts Manual, Urschel.

Brunner-Anliker product information on the IR 250 Industrial Food Process, "Industrial pre-rotating grinder for cheese, nuts, chocolate or rework for a production volume of up to 2 tons per hour". Available at https://www.brunner-anliker.com/en/food-industry/nut-and-cheese-graters/ir-250/.

* cited by examiner

CUTTING HEAD FOR A CENTRIFUGAL CUTTING APPARATUS AND CENTRIFUGAL CUTTING APPARATUS EQUIPPED WITH SAME

FIELD OF THE INVENTION

The present invention relates to a cutting head for a centrifugal cutting apparatus. More particularly, this invention relates to cutting heads suitable for cutting food product slices. The present invention further relates to a centrifugal cutting apparatus equipped with such a cutting head, such as for example a food cutting apparatus.

BACKGROUND ART

A centrifugal cutting apparatus comprises an impeller which is arranged to rotate concentrically within a cutting head so as to impart a centrifugal force to the food products to be cut. The cutting head is commonly an assembly of a plurality of cutting stations, also referred to as shoes, each provided with a cutting element arranged for cutting or reducing the food product concentrically rotating in the cutting head.

A centrifugal cutting apparatus is for example known from WO2013101621. As used therein, the term "rake-off angle" is measured as the angle that a slice shall deviate relative to a tangent line that begins at an intersection defined by the knife edge and a path of a product sliding surface defined by the interior surface of a leading shoe (cutting station), i.e. the shoe immediately upstream of a particular knife. The line is then tangent to the radial product sliding surface of the leading shoe.

In prior art centrifugal cutting apparatuses, including the one described in WO2013101621, the rake-off angle is 20.5° or more. It has been found that a rake-off angle of such magnitude may lead to cracking of the food slices, especially in potato slices.

SUMMARY OF THE INVENTION

It is an aim of the present invention to provide a cutting head for a centrifugal cutting apparatus with which the risk of cracking of food slices can be reduced.

This aim is achieved with the cutting head showing the technical characteristics of the first claim.

The invention provides, in a first aspect, a cutting head which comprises a plurality of cutting stations. Each cutting station is provided with a cutting element for cutting food products at a leading end of the cutting station and comprises an inner wall extending from the leading end to a trailing end and forming a product sliding surface, along which the food product slides between successive cuts. The cutting stations are assembled adjacent one another in such a way that a gap is present between each pair of adjacent cutting stations. A "rake-off angle" OR is defined as the angle that a product slice deviates upon being cut by one of the cutting elements and exiting the cutting head through the respective gap, said angle being measured relative to a tangent line to the product sliding surface at the trailing end of the respective preceding cutting station. According to the invention, for each cutting station a rear part of the product sliding surface at the trailing end is adapted such that the rake-off angle $\theta_R$ is below 17°.

It has been found that by adapting the rear part of the product sliding surface at the trailing end of each cutting station, the rake-off angle $\theta_R$ and consequently the risk of cracking of food slices can be reduced.

In embodiments according to the invention, the rear part of the product sliding surface at the trailing end is adapted such that the rake-off angle $\theta_R$ is below 16°.

In embodiments according to the invention, the rear part of the product sliding surface at the trailing end is adapted such that the rake-off angle $\theta_R$ is between 12° and 15°. It has been found that in this range the risk of cracking of the food slices can be minimized while still leaving enough physical space to accommodate the cutting element.

In embodiments according to the invention, each cutting station has a concave inner wall with a wall curvature $\mathbf{R1}^{-1}$ (with R1 being the radius of curvature and the curvature being the inverse of said radius R1) corresponding to an inner diameter of the cutting head, the rear part of the product sliding surface having a reduced curvature with respect to said wall curvature. This means that the rear part of the product sliding surface (i.e. the adapted part of the inner surface of the cutting station) deviates outwards from the mathematical (or theoretical) cylinder defined by the inner diameter of the cutting head. The rear part of the product sliding surface may have a reduced curvature $\mathbf{R2}^{-1}$ with respect to the wall curvature (or the mathematical cylinder) or even be a straight surface which extends tangent to the concave part of the inner wall. The length of the product sliding surface may for example be in the range of 3 to 30 mm, preferably in the range of 5 to 20 mm.

In embodiments according to the invention, the cutting element is a knife blade and the rear part of the product sliding surface is a straight surface which extends substantially parallel to a longitudinal direction of the knife blade. In other words, in this embodiment, the rear part of the product sliding surface and the outer surface of the knife blade or cutting element form substantially parallel surfaces between which the cut slice can exit.

In embodiments according to the invention, the size of the gap is set by means of gap setting elements. The (radial) size of the gap is defined by the relative position, or radial offset, of the rear part of the product sliding surface at the trailing end of one cutting station (the cutting station preceding the gap) and a front edge of the cutting element at the leading end of the other cutting station (the cutting station subsequent to the gap). The size of the gap determines the slice thickness. The gap setting elements may for example be formed by spacers mounted in between the leading and/or trailing ends of the cutting stations and a surrounding rim structure, or by spacers mounted in between overlapping parts of the cutting stations, or otherwise.

In embodiments according to the invention, the cutting head may be configured for cutting flat slices. This means that each cutting station is provided with a flat or substantially straight cutting element.

In embodiments according to the invention, the cutting head may be configured for cutting corrugated slices. This means that each cutting station is provided with a corrugated cutting element. The inner walls of the cutting stations may be formed with a corrugated shape (corrugated in height direction) corresponding to that of the corrugated slices so as to support the product in between successive cuts.

The invention provides, in a second aspect, a cutting head which comprises a substantially cylindrical drum with at least one cutting station arranged for cutting food product that is circulated in the drum by means of a rotating impeller. Each cutting station is provided with a cutting element for cutting the food product at a leading end of the cutting station. Each cutting station is rotationally preceded by a preceding section of the drum which comprises an inner wall extending up to a trailing end of the preceding section and forming a product sliding surface, along which the food product slides towards the respective cutting station. Each cutting station is assembled to the drum in such a way that a gap is present between the trailing end of the preceding section of the drum and the leading end of the cutting station. A "rake-off angle" OR is defined as the angle that a product slice deviates upon being cut by one of the cutting elements and exiting the cutting head through the respective gap, said angle being measured relative to a tangent line to the product sliding surface at the trailing end of the respective preceding section of the drum. According to the invention, a rear part of each product sliding surface is adapted such that the rake-off angle $\theta_R$ is below 17°.

It has been found that by adapting, for each cutting station, the rear part of the rotationally preceding product sliding surface, which is located at the trailing end of the respective preceding section of the drum, the rake-off angle $\theta_R$ and consequently the risk of cracking of food slices can be reduced.

In embodiments according to the invention, the rear part of each product sliding surface is adapted such that the rake-off angle $\theta_R$ is below 16°.

In embodiments according to the invention, the rear part of each product sliding surface is adapted such that the rake-off angle $\theta_R$ is between 12° and 15°. It has been found that in this range the risk of cracking of the food slices can be minimized while still leaving enough physical space to accommodate the cutting element.

In embodiments according to the invention, the drum generally has a concave inner wall with a wall curvature $R1^{-1}$ (with R1 being the radius of curvature and the curvature being the inverse of said radius R1) corresponding to an inner diameter of the cutting head, except for the rear part of each product sliding surface where the curvature is reduced with respect to said wall curvature. This means that the rear part of each product sliding surface (i.e. the adapted part of the inner surface of the preceding section of the drum) deviates outwards from the mathematical (or theoretical) cylinder defined by the inner diameter of the cutting head. The rear part of the product sliding surface may have a reduced curvature $R2^{-1}$ with respect to the wall curvature (or the mathematical cylinder) or even be a straight surface which extends tangent to the concave inner wall. The length of the product sliding surface may for example be in the range of 3 to 30 mm, preferably in the range of 5 to 20 mm.

In embodiments according to the invention, the size of the gap is set by means of a gap setting mechanism. The (radial) size of the gap is defined by the relative position, or radial offset, of the rear part of the respective product sliding surface and a front edge of the cutting element at the leading end of the respective cutting station. The size of the gap determines the slice thickness.

In embodiments according to the invention, the cutting head may be configured for cutting flat slices. This means that each cutting station is provided with a flat or substantially straight cutting element.

In embodiments according to the invention, the cutting head may be configured for cutting corrugated slices. The means that each cutting station is provided with a corrugated cutting element. The inner wall of the drum may be formed with a corrugated shape (corrugated in height direction) corresponding to that of the corrugated slices so as to support the product in between successive cuts.

The invention further provides a centrifugal cutting apparatus comprising a cutting head as described herein and an impeller which is arranged to rotate concentrically inside the cutting head.

BRIEF DESCRIPTION OF THE DRAWINGS

The present invention will be discussed in more detail below, with reference to the attached drawings.

DESCRIPTION OF EMBODIMENTS

Figure 1:
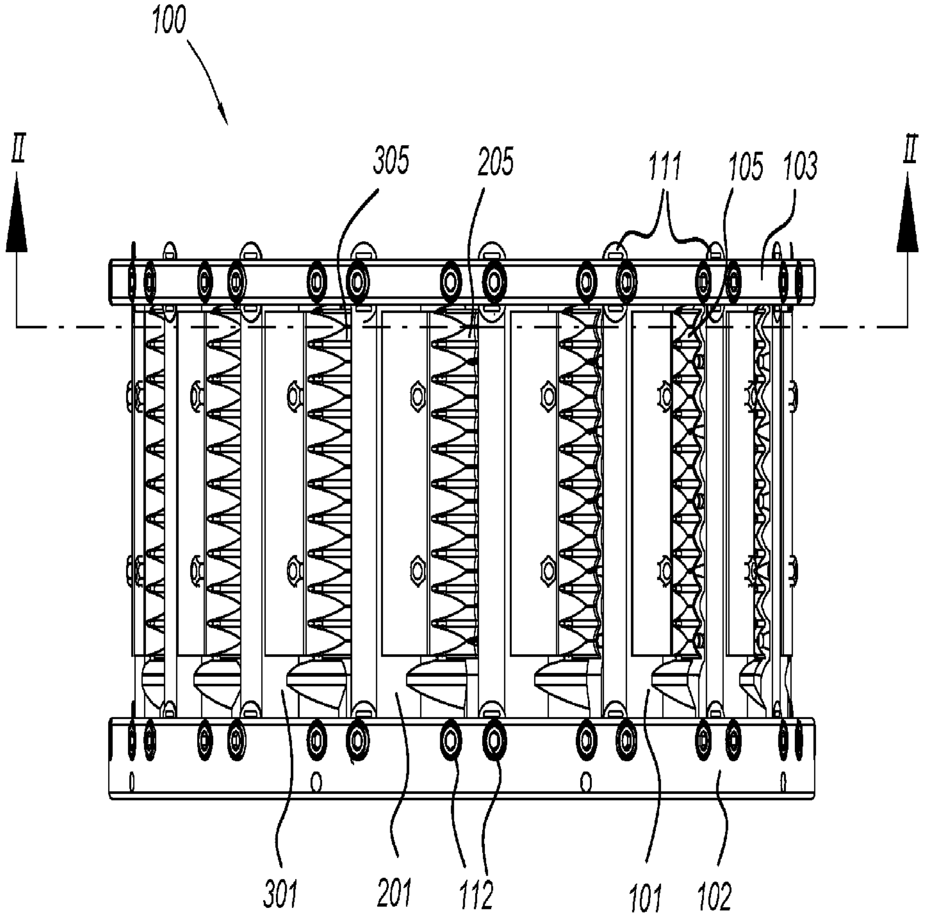
FIG. 1 shows a side view of a cutting head according to the invention.
Figure 2:
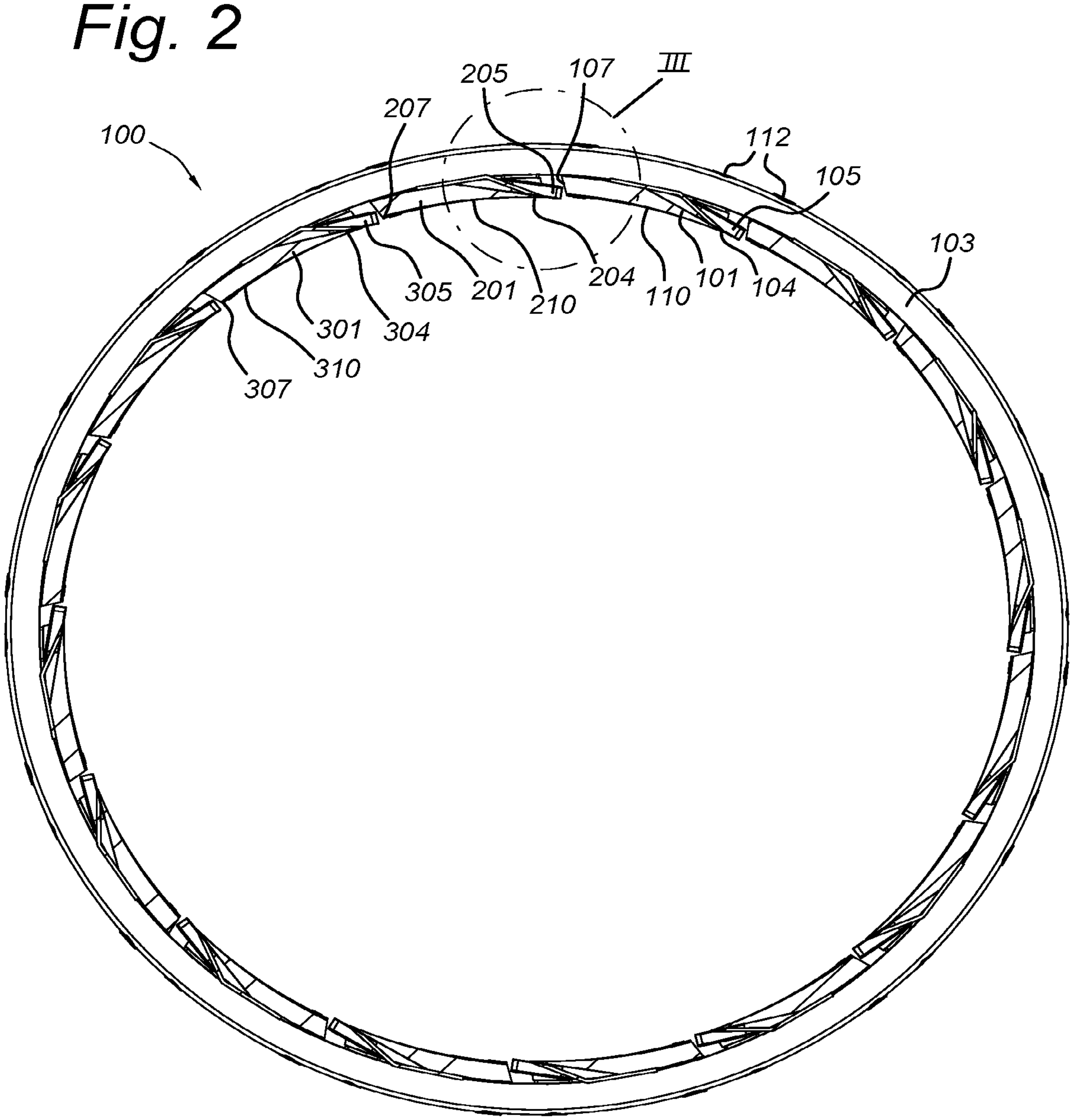
FIG. 2 shows a cross-section of the cutting head along line A-A of FIG. 1.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

FIG. 1 shows a cutting head 100 for a centrifugal cutting apparatus, according to the an embodiment of the invention, comprising a plurality of cutting stations 101, 201, 301, each provided with a cutting element 105, 205, 305 for cutting food products at a leading end 104, 204, 304 of the cutting station, and having an inner wall 110, 210, 310 which forms a product sliding surface and extends from the leading end up to the trailing end 107, 207, 307 of the cutting station.

The cutting stations 101, 201, 301 are assembled adjacent one another in such a way that a gap 109 (see FIGS. 3-5) is present between each pair of adjacent cutting stations.

The size of the gap 109 sets the slice thickness. The size of the gap is commonly known to refer to the offset in radial direction between the rear part 108', 108" of the product sliding surface 110, at the trailing end 107 of the one cutting station 101, and the front edge of the cutting element 205 at the leading end 204 of the other cutting station 201. The size of the gap can be adjusted by means of gap setting elements, embodiments of which will be described below.

The so-called "rake-off angle" OR is defined as the angle that a product slice deviates upon being cut by the cutting element 205 and being pushed through the gap 109 (by an impeller paddle, not shown). This angle is measured relative to a tangent line to the rear part of the product sliding surface of the preceding cutting station. According to the invention, for each cutting station 101, 201, 301 the rear part 108', 108" (see FIGS. 4 and 5) of the product sliding surface is adapted to reduce the rake-off angle $\theta_R$ below 17°, preferably below 16°, more preferably between 12° and 15°.

Figure 3:
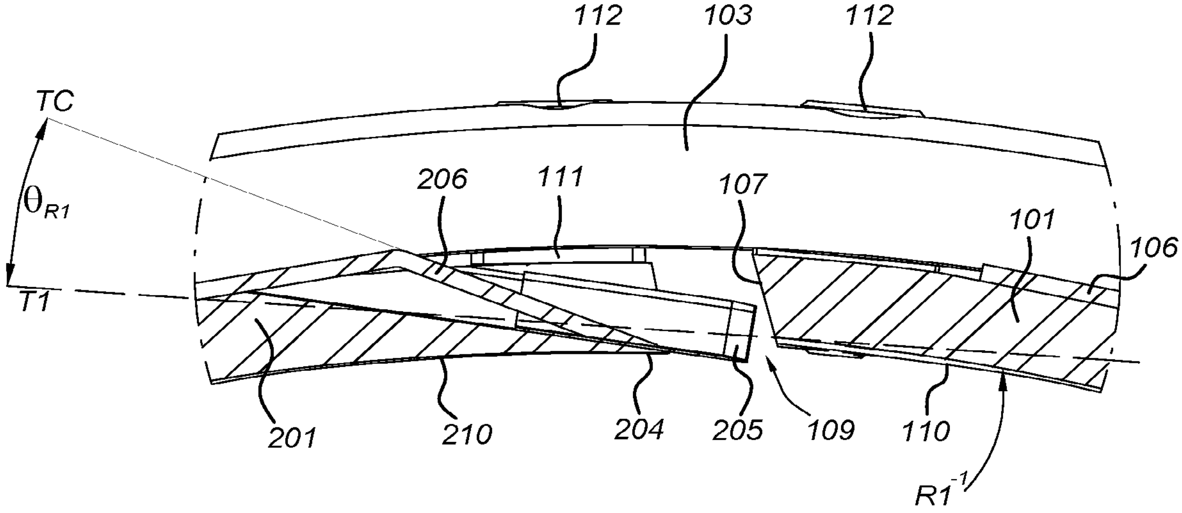
Fig. 3 Prior art.
FIG. 3 shows a detail of a cutting head of the prior art.
Figure 4:
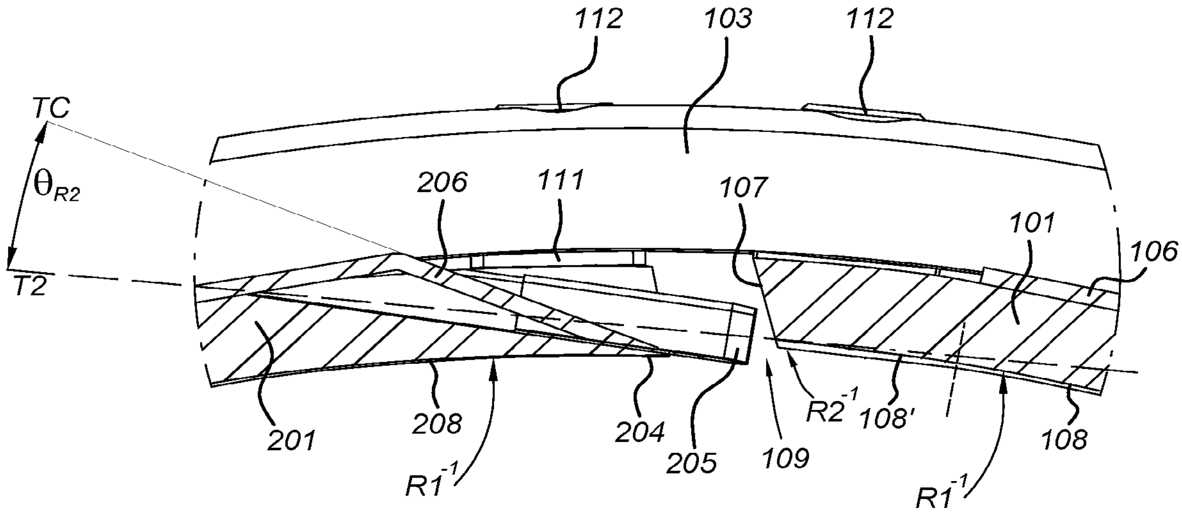
FIG. 4 shows a detail of a cutting head according to the invention.
Figure 5:
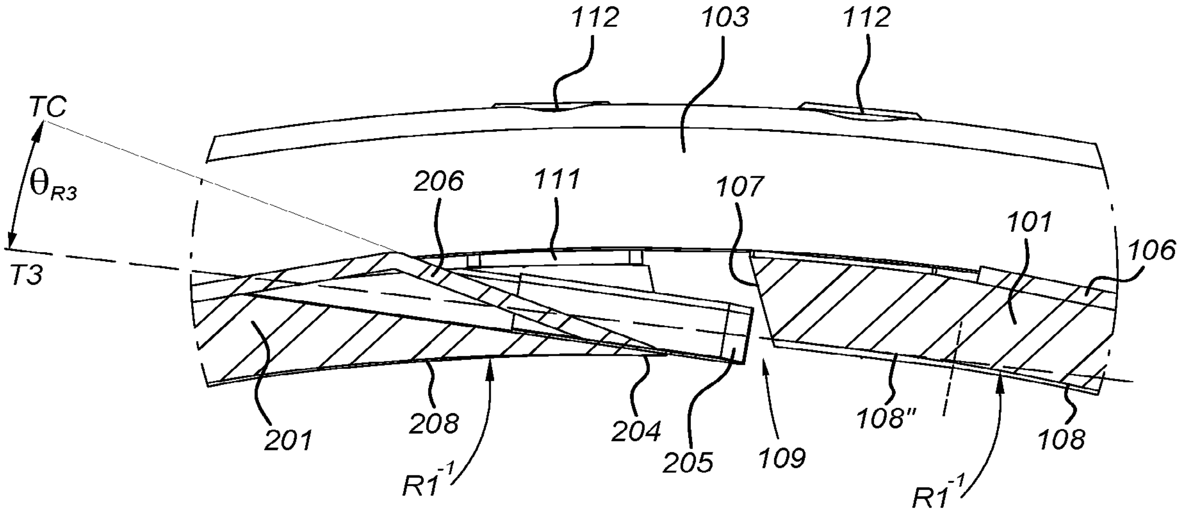
FIG. 5 shows a detail of another cutting head according to the invention.

As shown in FIGS. 3-5, the cutting elements 105, 205 of each cutting station 101, 201 are clamped onto the leading end 104, 204 of the cutting station by means of a clamp 106, 206. The cutting station, cutting element and clamp together form a knife assembly, embodiments of which have been described at length in WO2015075179 and WO2015075180, the descriptions of which are hereby incorporated by reference in their entirety.

In alternative embodiments, the cutting elements 105, 205 may also be formed by single-piece knives or cutting elements which are fixed to the cutting station without a clamp. In such embodiments, the rake-off angle $\theta_R$ may be further reduced and even be 0° if the rear part 108', 108" extends parallel to the outer surface of the knife (the top surface of the knife on the outside of the cutting head).

Each cutting station 101, 201, 301 has a concave inner wall 110, 210, 310 with a wall curvature $R1^{-1}$ corresponding to an inner diameter of the cutting head 100. The adapted rear part 108', 108" of the product sliding surface may for example be embodied as a rear part 108' with a reduced curvature $R2^{-1}$ with respect to said wall curvature $R1^{-1}$ (as shown in FIG. 4), or as a substantially straight surface 108" which is then preferably tangent to the concave part of the inner wall 110 (as shown in FIG. 5), or otherwise. The rear part 108', 108" may for example have a length of 3 to 30 mm, preferably 5 to 20 mm.

In the embodiment shown in FIGS. 1, 2 and 4, 5, the cutting stations are separately or individually mounted onto a rim structure 102, 103 by means of bolts 112 and the gap setting elements are spacers 111 mounted in between the leading and/or trailing ends of the cutting stations and the rim structure. This principle has been described at length in EP2918384, the description of which is hereby incorporated by reference in its entirety.

In an alternative embodiment (not shown), the cutting stations are assembled to each other at overlapping parts at the leading and trailing ends, said gap setting elements being spacers which are mounted between the overlapping parts. This principle has been described at length in WO2013045684, the description of which is hereby incorporated by reference in its entirety.

The cutting head 100 may be configured for cutting flat slices and may therefore be equipped with flat or straight knife assemblies as described at length in WO2015075179, the description of which is hereby incorporated by reference in its entirety.

The cutting head 100 shown in the figures is configured for cutting corrugated slices and is therefore equipped with corrugated knife assemblies as described at length in WO2015075180, the description of which is hereby incorporated by reference in its entirety. Each cutting station 101, 201, 301 may have an inner wall 110, 210, 310 with a corrugated shape corresponding to that of the corrugated slices, so as to better ensure that the cuts are aligned.

More in detail, the invention is described with reference to FIGS. 3-5.

FIG. 3 shows a detail of a prior art cutting head of the applicant. The inner wall 110 of the cutting stations 101, 201, 301 is entirely corresponding to the inner diameter of the cutting head and has a curvature $R1^{-1}$. The rake-off angle θR1 is measured between the tangent line T1 to the product sliding surface 110 at the trailing end 107 and the line TC which is drawn on the slanted surface of the clamp 206 and which is the direction along which a product slice exits the cutting head. In FIG. 3, the rake-off angle θR1 is 20.5°.

FIG. 4 shows a detail of a first embodiment according to the invention. The inner wall 110 has a main concave part 108 which corresponds to the inner diameter of the cutting head and has the curvature $R1^{-1}$, and a rear part 108' which has a reduced curvature $R2^{-1}$ and which, as a result, deviates radially outward. As a result of this outward deviation, the rake-off angle θR2 which is here measured between the tangent line T2 to the rear part 108' and the line TC, is reduced with respect to FIG. 3. In FIG. 4, the rake-off angle θR2 is about 15°.

FIG. 5 shows a detail of a second embodiment according to the invention. The inner wall 110, 210 has a main concave part 108, 208 which corresponds to the inner diameter of the cutting head and has the curvature $R1^{-1}$, and a rear part 108" which is straight (the curvature is 0) and tangent to the end of the main concave part 108, and which, as a result, deviates radially outward. As a result of this outward deviation, the rake-off angle θR3 which is here measured between the tangent line T3 to the rear part 108" (T3 is also the direction of the straight part 108") and the line TC, is further reduced with respect to FIG. 4. In FIG. 5, the rake-off angle θR3 is 13.5°. For example, the rear part 108" may extend substantially parallel to the longitudinal direction of the knife blade 205.

The adapted rear parts 108', 108" of the embodiments of FIGS. 4 and 5 can for example be obtained by milling off a part of the inner wall of the cutting station near the trailing end 107. Other manufacturing methods are also possible.

Figure 6:
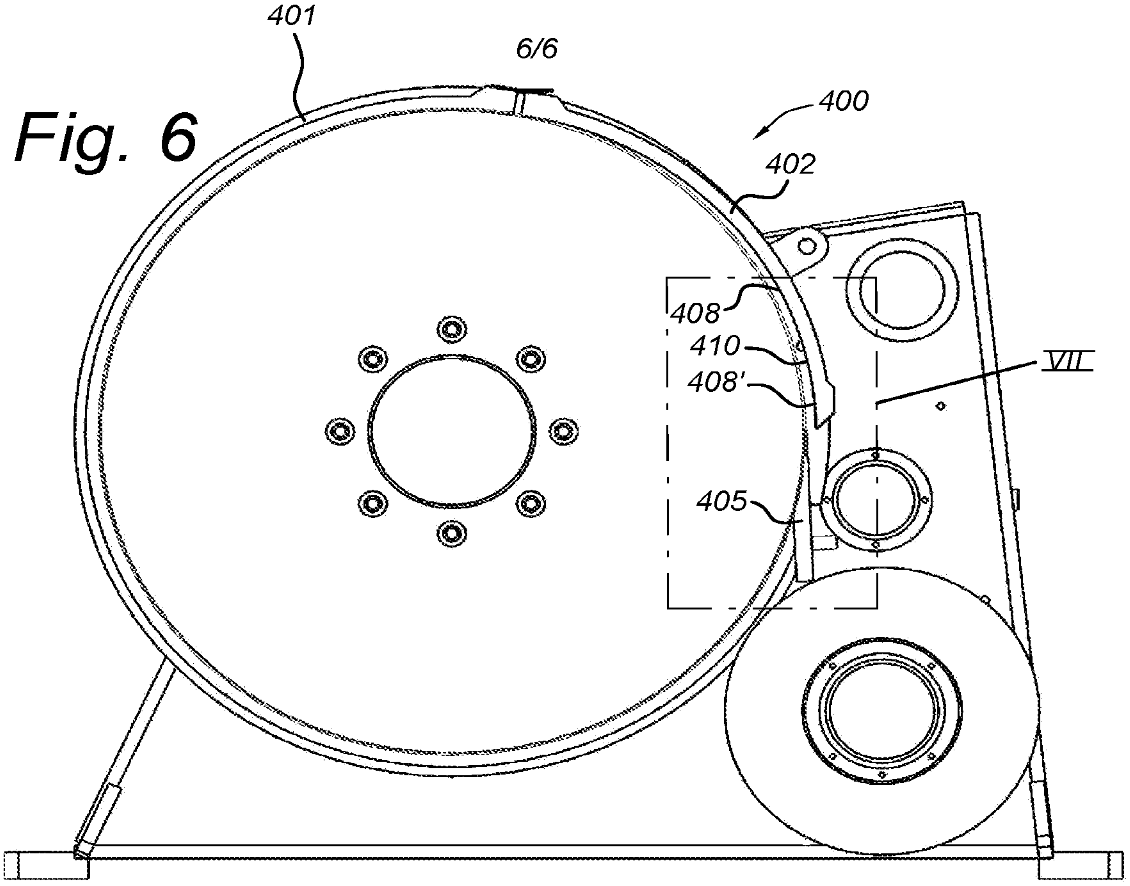
FIG. 6 shows a cross-section of yet another cutting apparatus according to the invention.
Figure 7:
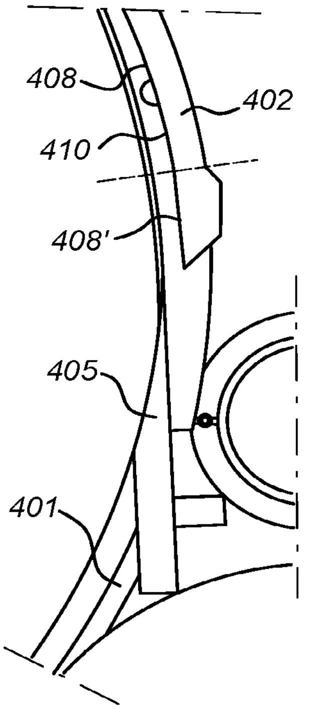
FIG. 7 shows a detail of FIG. 6

The cutting apparatus 400 shown in FIG. 6 is of the type comprising a cylindrical drum 401 with a single cutting element 405. A section 402 of the drum leading up to the cutting element 405 is movably mounted, in particular pivotally mounted, such that the position of the product sliding surface 410 with respect to the cutting element 405 and hence the slice thickness can be adjusted. An impeller (not shown) circulates the product to be cut inside the drum, so that the product is pushed against the inner wall of the drum by centrifugal force. Applicant manufactures and sells cutting apparatuses of this type under the brand "ILC".

In FIG. 6, such an apparatus 400 is shown but adapted according to the invention. The product sliding surface of the movable section 402 has a main concave part 408 and a rear part 408', which is modified in the same way as described for the rear part of the cutting stations of the other embodiments described herein so as to reduce the "rake-off angle". In particular, the rear part 408' deviates outward and has a reduced curvature with respect to that of the inner wall of the drum 401 and the main part 408 of the movable section 402. In preferred embodiments, the rear part 408' may be straight. The cutting element 405 may be formed by a single-piece knife which is fixed to the drum without a clamp. In this embodiment, the rake-off angle $\theta_R$ may be 0° if the rear part 408', extends parallel to the outer surface of the knife (the top surface of the knife on the outside of the drum). In alternative embodiments, a knife assembly such as has been described herein for the embodiments of FIGS. 1-5 may also be used in this type of apparatus 400.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

REFERENCE LIST

100 cutting head
101, 201, 301 cutting station
102, 103 rim structure
104, 204, 304 leading end of cutting station
105, 205, 305 cutting element
106, 206 clamp
107, 207, 307 trailing end of cutting station
108, 208 main concave part
108', 108" rear part
109 gap
110, 210, 310 inner wall/product sliding surface
111 spacer
112 bolt
$R1^{-1}$ inner wall curvature
T1, T2, T3, TC tangent line
$R2^{-1}$ reduced curvature
OR1, OR2, OR3 rake-off angle
400 cutting apparatus
401 drum
402 movable section
405 cutting element
408 main concave part
408' rear part
410 inner wall/product sliding surface

The invention claimed is:

1. A cutting head for a centrifugal cutting apparatus, said cutting head comprising a rim structure;

a plurality of cutting stations which are mounted onto the rim structure, each of which is provided with a cutting element for cutting food products at a leading end of the cutting station and comprises an inner wall extending from the leading end to a trailing end and forming a product sliding surface, along which the food product slides between successive cuts, said cutting stations being assembled adjacent one another in such a way that a gap is present between each pair of adjacent cutting stations through which a product slice exits the cutting head upon being cut by one of the cutting elements;

a gap setting mechanism provided between the trailing ends of the cutting stations and the rim structure for setting the radial size of the gap by adjusting the radial offset of the trailing end of the respective cutting station with respect to the rim structure;

wherein for each cutting station a rear part of the product sliding surface at the trailing end is adjusted.

2. The cutting head according to claim 1, wherein the gap setting mechanism adjusts the rear part of the respective cutting station without adjusting the position of the leading end of the respective cutting station.

3. The cutting head according to claim 1, wherein the curvature of the rear part of the product sliding surface is adjusted.

4. The cutting head according to claim 3, wherein the curvature is adjusted to reduce the rake-off angle.

5. The cutting head according to claim 4, wherein the rake-off angle is below 17°.

6. The cutting head according to claim 4, wherein the rake-off angle is below 16°.

7. The cutting head according to claim 4, wherein the rake-off angle is between 12° and 15°.

8. The cutting head according to claim 1, wherein for each cutting station the inner wall is generally concave with a wall curvature, wherein the adjusted rear part of the product sliding surface has a reduced curvature with respect to said wall curvature.

9. The cutting head according to claim 1, wherein the rear part of the product sliding surface is a straight surface extending tangent to a concave part of the inner wall.

10. The cutting head according to claim 1, wherein the rear part of the product sliding surface has a length of 3 to 30 mm.

11. The cutting head according to claim 1, wherein the cutting stations are separately mounted onto the rim structure and the gap setting mechanism comprises spacers between the trailing ends of the cutting stations and the rim structure.

12. The cutting head according to claim 1, wherein the cutting stations are mounted onto the rim structure by means of bolts.

13. The cutting head according to according to claim 1, wherein the cutting head comprises knives for cutting flat slices.

14. The cutting head according to according to claim 1, wherein the cutting head comprises knives for cutting corrugated slices.

15. The cutting head according to claim 14, wherein at least part of the product sliding surface of each cutting station has a corrugated shape corresponding to that of the corrugated slices.

16. A centrifugal cutting apparatus comprising a cutting head according to claim 1 and an impeller which is arranged to rotate concentrically within the cutting head.

* * * * *